(12) United States Patent
Khan et al.

(10) Patent No.: US 9,344,022 B2
(45) Date of Patent: May 17, 2016

(54) CIRCUITS AND METHODS FOR DRIVING RESONANT ACTUATORS

(71) Applicant: QUALCOMM Incorporated, San Diego, CA (US)

(72) Inventors: Qadeer A Khan, San Diego, CA (US); Sandeep Chaman Dhar, San Diego, CA (US); Joshua A Zazzera, Phoenix, AZ (US); Todd R Sutton, Del Mar, CA (US)

(73) Assignee: QUALCOMM Incorporated, San Diego, CA (US)

( * ) Notice: Subject to any disclaimer, the term of this patent is extended or adjusted under 35 U.S.C. 154(b) by 185 days.

(21) Appl. No.: 14/024,359

(22) Filed: Sep. 11, 2013

(65) Prior Publication Data

US 2015/0069939 A1   Mar. 12, 2015

(51) Int. Cl.
*H02P 1/00* (2006.01)
*H02P 6/18* (2016.01)
*H02P 6/14* (2016.01)
*H02P 25/02* (2016.01)

(52) U.S. Cl.
CPC ............... *H02P 6/182* (2013.01); *H02P 6/145* (2013.01); *H02P 25/027* (2013.01)

(58) Field of Classification Search
CPC ................................. H02P 6/147; H02P 6/182
USPC .................................................. 318/128, 129
See application file for complete search history.

(56) References Cited

U.S. PATENT DOCUMENTS

| | | | |
|---|---|---|---|
| 6,437,524 B1 | 8/2002 | Dimanstein | |
| 6,918,300 B2 | 7/2005 | Grez et al. | |
| 8,272,592 B2 | 9/2012 | Badre-Alam et al. | |
| 8,314,586 B2 | 11/2012 | Lumbantobing et al. | |
| 8,994,518 B2 | 3/2015 | Gregorio et al. | |
| 9,054,627 B2 | 6/2015 | Garg et al. | |
| 2002/0175643 A1 | 11/2002 | Gokturk | |
| 2003/0102828 A1 | 6/2003 | Kusakabe | |
| 2006/0244339 A1* | 11/2006 | Mazz et al. | 310/317 |
| 2010/0289381 A1 | 11/2010 | Xu et al. | |
| 2011/0181211 A1* | 7/2011 | Murata | 318/129 |
| 2015/0137713 A1 | 5/2015 | Barsilai et al. | |
| 2015/0204925 A1 | 7/2015 | Hernandez et al. | |

FOREIGN PATENT DOCUMENTS

EP   2120011 A1 * 11/2009

OTHER PUBLICATIONS

International Search Report and Written Opinion—PCT/US2014/055082—ISA/EPO—Jan. 30, 2015.

* cited by examiner

*Primary Examiner* — Eduardo Colon Santana
*Assistant Examiner* — Bickey Dhakal
(74) *Attorney, Agent, or Firm* — Fountainhead Law Group P.C.

(57) ABSTRACT

The present disclosure includes circuits and methods for driving resonant actuators. In one embodiment, a drive signal is applied to an actuator during a portion of a plurality of half cycles of a period of the drive signal. The actuator has a resonant frequency and may vibrate in response to the drive signal. An induced voltage is generated on terminals of the actuator in response to the vibration. A detection circuit may detect when the induced voltage on the actuator crosses a threshold after the drive signal is turned off. The drive signal may be triggered based on when the induced voltage crosses the threshold to align a frequency and phase of the drive signal with the resonant frequency and a phase of the actuator.

23 Claims, 12 Drawing Sheets

Half Cycle Drive

Combined Full and Partial Drive (N=1)

Combined Full and Partial Drive (N=2)

CIRCUITS AND METHODS FOR DRIVING RESONANT ACTUATORS

BACKGROUND

The present disclosure relates to electronic systems and methods, and in particular, to circuits and methods for driving resonant actuators.

FIG. 1 illustrates an example of electro-mechanical actuator 100. Electro-mechanical actuators typically include an inductive coil, such as a voice coil, a magnet, a mass, and a spring. This example shows a linear resonant actuator, where a magnetic field is generated by driving coil 101 with a drive signal on wires 102a and 102b. The magnetic field interacts with a magnet 105 in a central region 104 of a mass 103. The magnetic field creates a force to move mass 103. The mass 103 and magnet 105 are suspended on a spring 106 inside a casing 108 and 109. As the magnetic field varies with the applied drive signal, the magnet and mass move as they interact with the spring, which creates a vibration.

Resonant actuators may be modeled as a high-Q mechanical vibration module that has a particular resonant frequency. Traditionally, drive circuits have attempted to drive actuators at the resonant frequency to achieve a desired mechanical vibration. However, a variety of factors may cause the resonant frequency to drift. Drift may occur due to temperature, aging, orientation, and mechanical tolerances, for example. In some cases, drift may change the resonant frequency by +/−10% for the combined effects mentioned above. When the drive frequency differs from the resonant frequency by even 2-3%, the vibration strength may drop by as much as 50%. Therefore, maintaining desired vibration strength may require more power when the drive frequency is misaligned with the resonant frequency. The excessive power not only reduces the system efficiency but may also pose reliability issues due to overheating of the coil.

SUMMARY

The present disclosure includes circuits and methods for driving resonant actuators. In one embodiment, the present invention includes a method comprising applying a drive signal to an actuator during at least a portion of a plurality of half cycles of a period of the drive signal, wherein the actuator has a resonant frequency, detecting when an induced voltage on the actuator crosses a threshold after the drive signal is turned off, and triggering the drive signal based on when the induced voltage crosses the threshold to align a frequency and phase of the drive signal with the resonant frequency and a phase of the actuator.

In one embodiment, the portion of the plurality of half cycles is less than or equal to a half cycle.

In one embodiment, the portion of the plurality of half cycles is programmable.

In one embodiment, a peak of the drive signal is approximately centered between a first time when the induced voltage on the actuator crosses the threshold and a second time when the induced voltage on the actuator crosses the threshold.

In one embodiment, the method further comprises skipping one or more half cycles to adjust a strength of a vibration of the actuator.

In one embodiment, the method further comprises changing a duration of the portion of the plurality of half cycles to adjust a strength of a vibration of the actuator.

In one embodiment, the method further comprises applying the drive signal during one or more full cycles followed by at least one partial cycle, wherein said detecting is performed during said partial cycle, and wherein the period of the drive signal during subsequent full cycles of the drive signal is set based on when the induced voltage crosses the threshold.

In one embodiment, the induced voltage on the actuator is a back electromotive force (EMF) and the threshold is a zero crossing.

In one embodiment, the method further comprises applying a high impedance to the actuator after applying the drive signal and before said detecting.

In one embodiment, the drive signal comprises one of a partial sinusoidal analog signal, a square wave, and a plurality of pulses.

In another embodiment, the present invention includes a circuit comprising a driver circuit to apply a drive signal to an actuator during a portion of a plurality of half cycles of a period of the drive signal, wherein the actuator has a resonant frequency, a detection circuit to detect when an induced voltage on the actuator crosses a threshold after the drive signal is turned off, and a timing circuit having an input coupled to the detection circuit and an output coupled to the driver circuit to trigger the drive signal based on when the induced voltage crosses the threshold to align a frequency and phase of the drive signal with the resonant frequency and a phase of the actuator.

In one embodiment, the portion of the plurality of half cycles is less than or equal to a half cycle.

In one embodiment, the portion of the plurality of half cycles is programmable.

In one embodiment, a peak of the drive signal is approximately centered between a first time when the induced voltage on the actuator crosses the threshold and a second time when the induced voltage on the actuator crosses the threshold.

In one embodiment, one or more half cycles are skipped to adjust a strength of a vibration of the actuator.

In one embodiment, the driver circuit further comprises a plurality of transistors configured to apply the drive signal to a first terminal and a second terminal of the actuator, wherein the transistors are turned off after applying the drive signal.

In one embodiment, the detection circuit comprises a comparator having at least one input coupled to a first terminal of the actuator, wherein the timing circuit comprises a drive control circuit and a clock generator, the drive control circuit having a first input coupled to an output of the comparator and a second input coupled to receive a reference clock signal to determine the resonant frequency of the actuator, and in accordance therewith, program a frequency of a time base signal generated by the clock generator, wherein the time base signal sets a duration of the drive signal.

In one embodiment, the timing circuit comprises a phase detector having a first input coupled to an output of the comparator and a second input coupled to receive a time base signal, an accumulator coupled to an output of the phase detector, an adder having a first input coupled to an output of the accumulator and a second input to receive an initial divider value, and a divider having a first input coupled to an output of the adder to receive a divider value and a second input to receive a reference clock signal. If the frequency of the time base signal is lower than the resonant frequency of the actuator, the accumulator increases the divider value to increase the frequency of the time base signal, and if the frequency of time base signal is greater than the resonant frequency of the actuator, the accumulator decreases the divider value to decrease the frequency of time base signal.

In one embodiment, the detection circuit comprises a delay element having a first input coupled to one terminal of the actuator and a second input coupled to receive a time base signal and a comparator having a first input coupled to the input of the delay element and a second input coupled to an output of the delay element to compare the induced voltage on the actuator on successive edges of the time base signal, and the timing circuit comprises an accumulator coupled to an output of the comparator, an adder having a first input coupled to an output of the accumulator and a second input to receive an initial divider value, and a divider having a first input coupled to an output of the adder to receive a divider value and a second input to receive a reference clock signal. If a frequency of the time base signal is lower than the resonant frequency of the actuator, then a present induced voltage from the actuator is different than a delayed induced voltage from the actuator by a first polarity, and the frequency of the time base signal is increased, and if the frequency of the time base signal is greater than the resonant frequency of the actuator, then a present induced voltage from the actuator is different than the delayed induced voltage from the actuator by a second polarity, and the frequency of the time base signal is decreased.

In one embodiment, the induced voltage on the actuator is a back electromotive force (EMF) and the threshold is a zero crossing, and wherein the drive signal comprises a plurality of pulses applied between zero crossings.

The following detailed description and accompanying drawings provide a better understanding of the nature and advantages of the present disclosure.

DETAILED DESCRIPTION

The present disclosure pertains to driving resonant actuators. In the following description, for purposes of explanation, numerous examples and specific details are set forth in order to provide a thorough understanding of the present disclosure. It will be evident, however, to one skilled in the art that the present disclosure as expressed in the claims may include some or all of the features in these examples alone or in combination with other features described below, and may further include modifications and equivalents of the features and concepts described herein.

Figure 1:
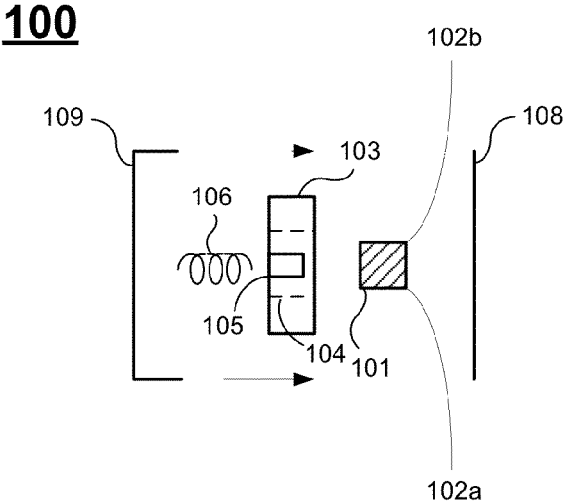
FIG. 1 illustrates an example actuator.

Embodiments of the present disclosure include circuits and methods for driving electro-mechanical actuators, such as a linear resonant actuator shown in FIG. 1, for example. Some embodiments may include a method where a periodic drive signal is applied to an electro-mechanical actuator having a resonant frequency. Movement caused by the drive signal may cause an induced voltage in the actuator. The induced voltage may be a back electromotive force (EMF), for example. Back EMF is a voltage, or electromotive force, that pushes against a current in an inductive coil. When the drive signal is turned off, the induced voltage is detected. In particular, circuitry may detect when the induced voltage on the actuator crosses a threshold after the drive signal is turned off. The threshold may be a zero crossing of an induced voltage generated by a vibration of the actuator. For example, when that actuator is turned off, a drive circuit may be placed in a high impedance state, and the movement of the actuator produces the induced voltage. Accordingly, the point at which the induced voltage crosses the threshold may correspond to the resonant frequency of the actuator and may be used to trigger a drive signal so that the phase and frequency of the drive signal is aligned with the resonant frequency and a phase of the actuator. This technique has the advantage of driving the actuator with a natural frequency of the actuator even as the resonant frequency may drift over time. Additionally, partial cycle drive signals allow the drive signal period (and therefore, frequency) to be set by zero crossings detected each cycle. For some actuators (e.g., with high Q), this technique advantageously allows for a more efficient use of mechanical energy in the actuator.

Figure 2:
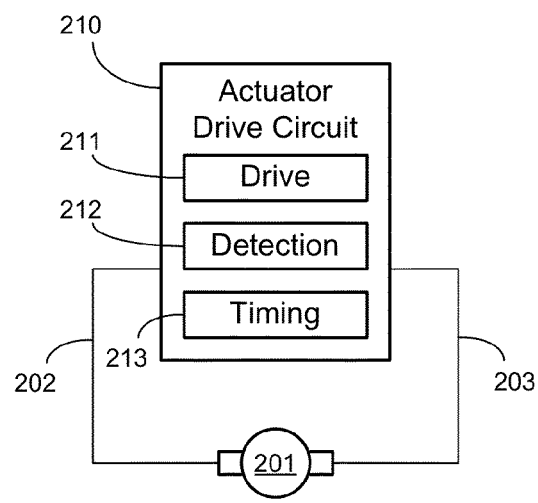
FIG. 2 illustrates an example actuator drive circuit according to an embodiment of this disclosure.

FIG. 2 illustrates an example of an actuator drive circuit according to an embodiment of this disclosure. An electro-mechanical actuator 201 may include two terminals 202 and 203 for receiving drive signals from actuator drive circuit 210. Actuator drive circuit 210 may include a drive circuit 211, detection circuit 212, and timing circuit 213. Drive circuit 211 may generate drive signals to actuator terminals 202 and 203 to generate a current in a coil for producing a movement in the actuator 201. Detection circuit 212 may detect the voltage (e.g., a back EMF) on drive terminals 202 and 203 to detect zero crossings, for example. Timing circuit 213 may generate timing signals based on the detected terminal voltages to control the drive signal generated by drive circuit 211. For example, timing circuit 213 may trigger the drive signal based on when the induced voltage crosses the threshold to align a frequency and phase of the drive signal with the resonant frequency and a phase of the actuator. In one example implementation, the drive circuit, detection circuit, or timing circuit (or combinations thereof) may be implemented on an integrated circuit and coupled to the actuator terminals through integrated circuit pads and/or package pins. While the present example shows a double ended implementation, it is to be understood that a single ended implementation may also be used. For example, a detection circuit may comprise a comparator having one input (single ended) or two inputs (double ended) coupled to one terminal or two terminals of the actuator, respectively.

Figure 3A:
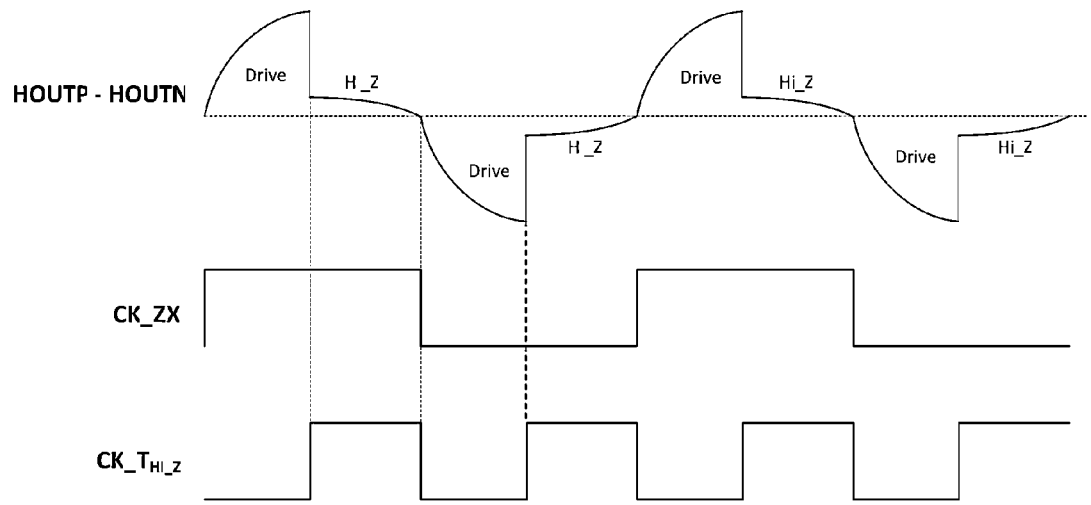
FIGS. 3A-D illustrate example drive signals for driving an actuator according to certain embodiments.

FIG. 3A illustrates one example drive signal for driving an actuator. In this example, the drive signal is a differential signal, HOUTP-HOUTN, applied across two terminals of the actuator. Here, the drive signal is applied during a quarter portion of each half cycle of a vibration period of the actuator. Although, as described below, other portions less than or equal to a half cycle may be used and the portions may even be programmable. The vibration during the other quarter of every half cycle is maintained by the mechanical property of a spring, for example. The drive signal in this example is a partial sinusoidal analog signal. After a quarter period, the drive signal is turned off and the terminals of the actuator are placed in a high impedance (Hi_Z) state. When the terminals transition to high impedance, the voltage on the actuator terminals transitions from the drive signal voltage to an induced voltage caused by the mechanical movement of the actuator (e.g., back EMF). The induced voltage, depending on polarity, increases or decreases over time and eventually crosses a threshold. The threshold may be based on the differential voltages across the actuator terminals. For example, the threshold may correspond to when the differential voltage goes to zero (a zero crossing). Such a zero crossing may be detected after each drive cycle. In this example, detection of a zero crossing may trigger the start of the drive signal for the next quarter wave, which is opposite in polarity compared to the previous quarter cycle. As illustrated in FIG. 3, the zero crossings may be used to set the period of a clock signal, CK_ZX, and the period of another signal, CK_T$_{HI\_Z}$, for placing the drive signal in a high impedance state. CK_T$_{HI\_Z}$ may be used to set the duration of the drive and high impedance (hi-z) signals, for example, so that the duration of the drive and hi-z signals is more closely aligned with the programmed portion of resonant period of the actuator. Accordingly, if the resonant frequency drifts, the zero crossings also change, and the duration of the drive signal tracks the resonant period to maintain the quarter or other programmed portion of drive.

Figure 3B:
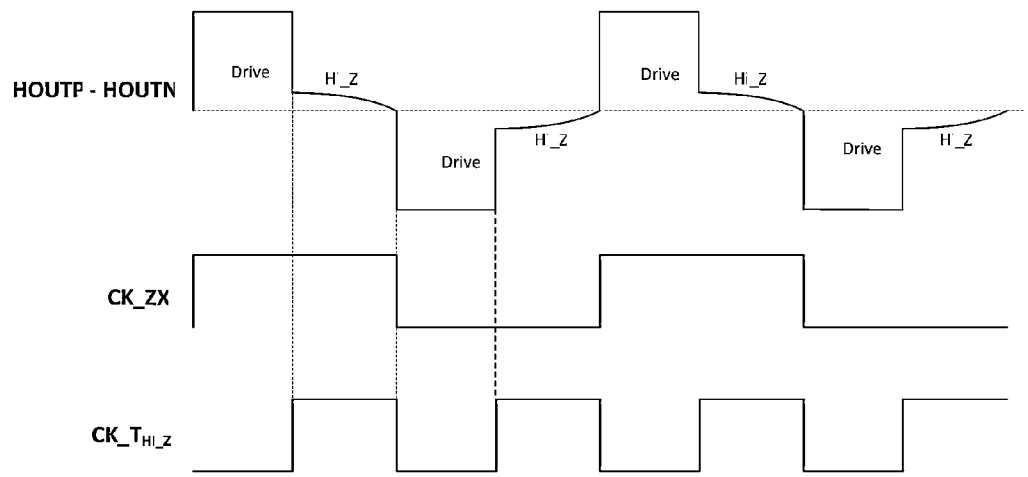
Figure 3C:
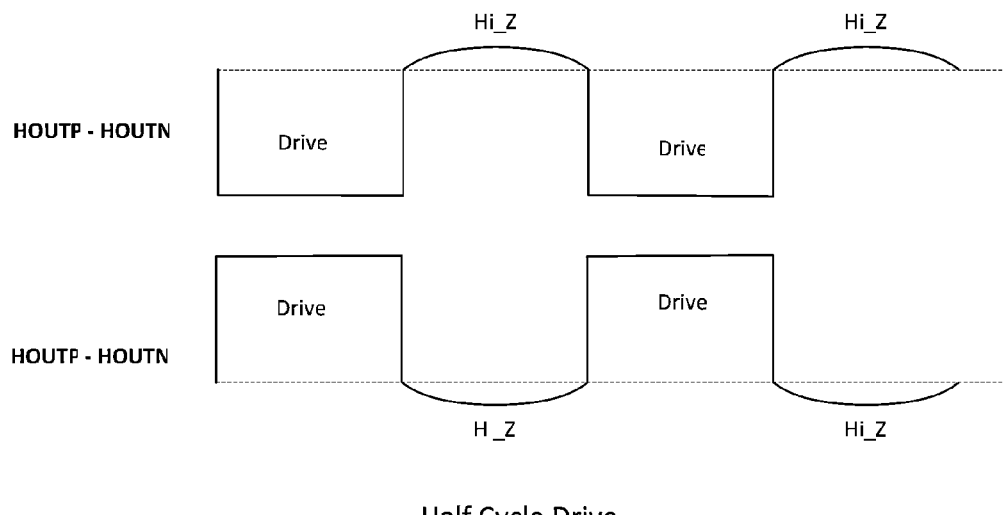

FIG. 3B illustrates another embodiment where the drive signal is square wave. FIG. 3C illustrates that the duration of the drive signal may be different in different embodiments. In FIG. 3C, the duration of the drive signal (e.g., the amount of time that the drive signal is active over the half cycle) is a full half cycle. As mentioned above, the duration may be programmable either as a one-time setting or programmed during operation (e.g., to change the strength of the vibration as described below).

Figure 3D:
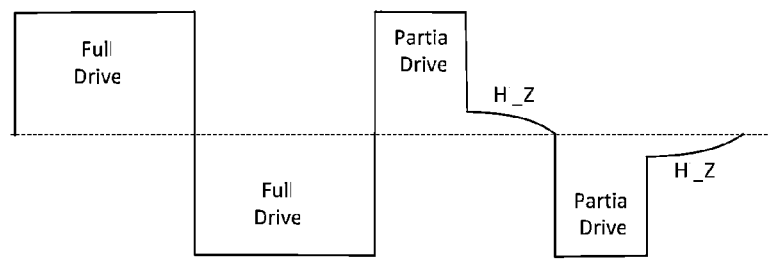
Figure 3D:
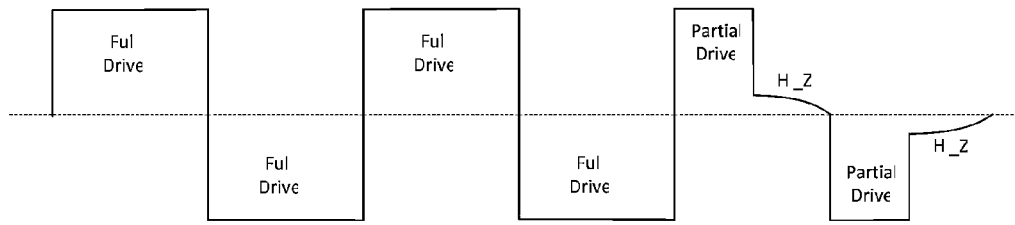

FIG. 3D illustrates another embodiment where one or more (N) full cycles are followed by one or more half cycles. In this example, partial drive can be used intermittently to detect a resonant frequency of an actuator and control the period of drive for one or more subsequent full cycles. As illustrated in FIG. 3D, a partial drive signal may be inserted after N cycles of full drive (N=1, 2, 3, . . . ). In different embodiments, one or more partial cycles may be used, and the number of partial cycles may be programmable.

Figure 3E:
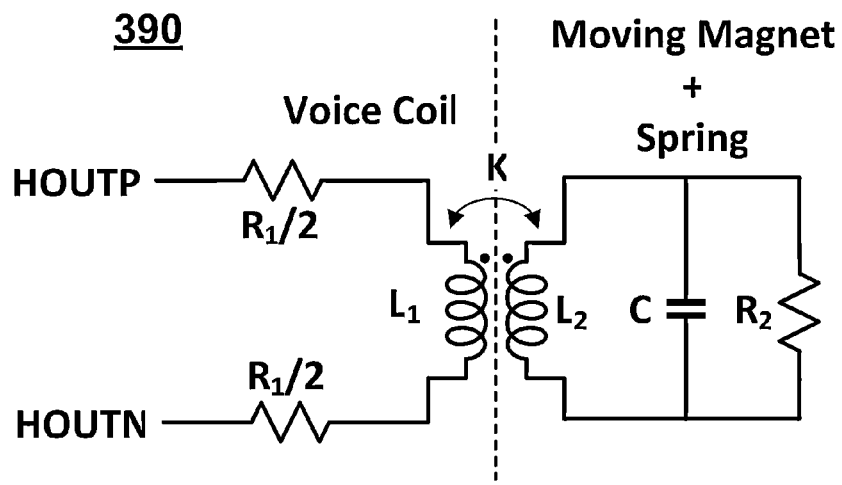
FIG. 3E illustrates an example model of an actuator according to one embodiment.
Figure 3E:
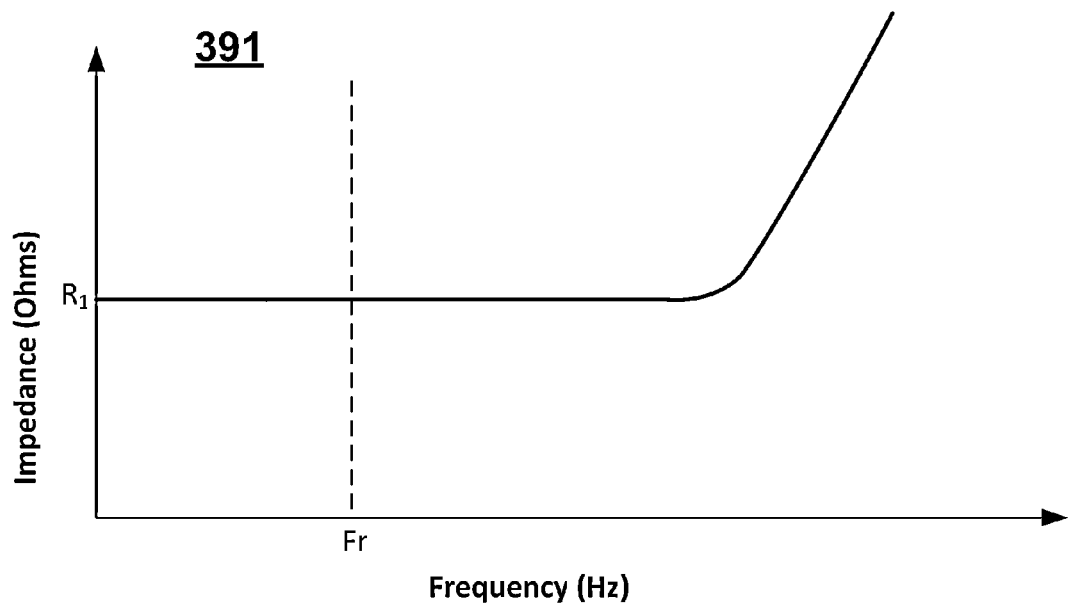

FIG. 3E illustrates a model for an actuator according to one example embodiment. The elements of the model for the actuator are shown at 390 and the impedance of the actuator versus frequency is shown at 391. The model 390 couples the moving magnet and spring to voice coil magnetically which ensures input impedance is mainly determined by the voice coil. There might be a small change in input impedance at resonance frequency due to back emf, but this effect may be negligible and is ignored in this example. K is coupling factor which models the magnetic coupling between voice coil and moving magnet.

Figure 4:
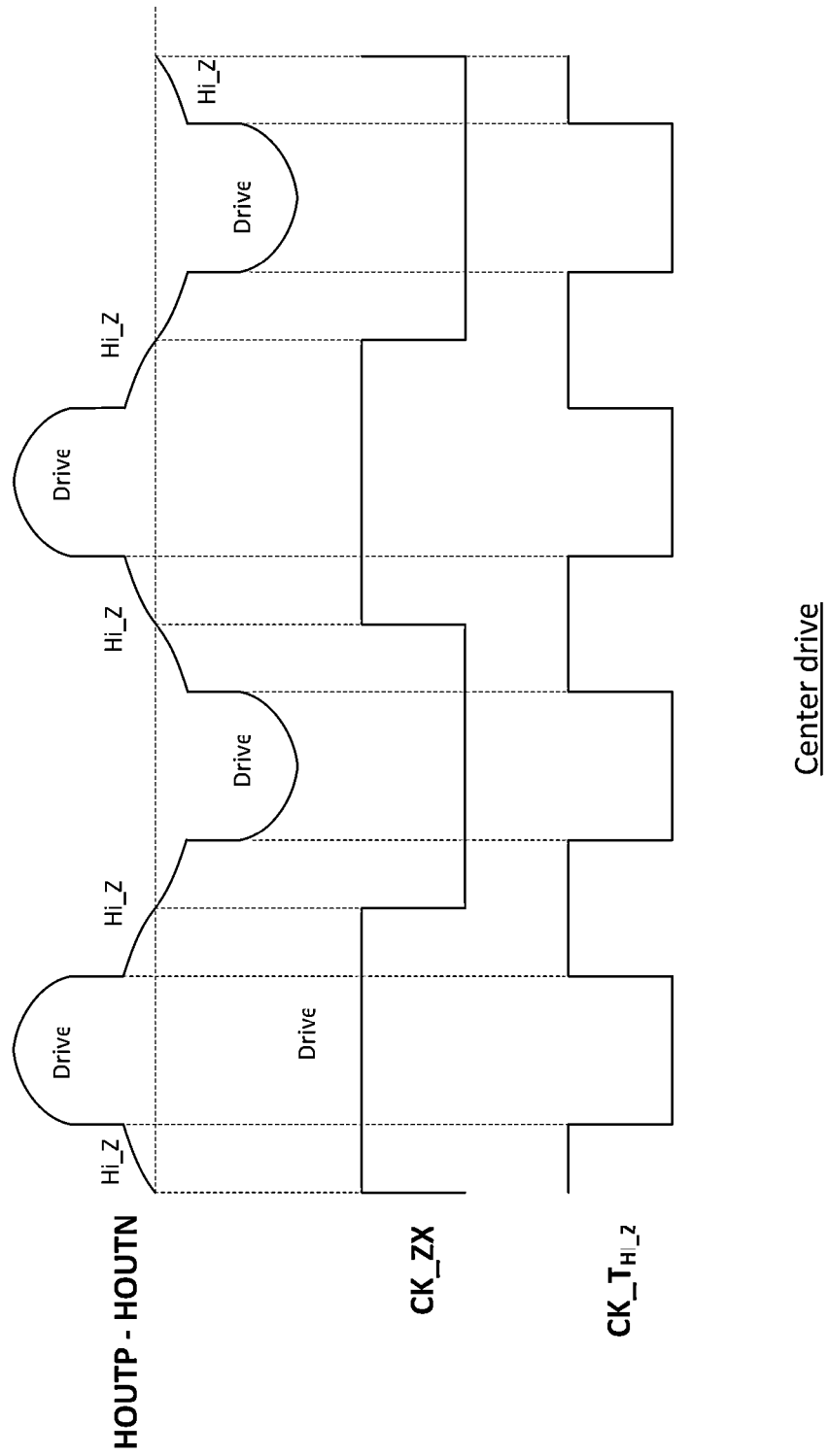
FIG. 4 illustrates another embodiment where the drive signal is centered between zero crossings according to another embodiment.

FIG. 4 illustrates an example of centering the drive signal. In this example, detection of zero crossings may be used to trigger the driver signal as well as set the period of CK_ZX and CK_T$_{HI\_Z}$. CK_ZX may be used to control the location of the peak during each cycle, for example, and CK_T$_{HI\_Z}$ may be used to set the duration of the drive signal. As illustrated in FIG. 4, a peak of the drive signal is centered between the zero crossings. CK_T$_{HI\_Z}$ may turn the HI_Z on and off so that the duty cycle of CK_T$_{HI\_Z}$ may set the duration of the drive signal at the input of the actuator. Accordingly, CK_T$_{HI\_Z}$ is delayed from CK_ZX so that the time the drive signal is active coincides with the peak, which is centered between zero crossings. As described in more detail below, a drive control circuit may determine a time period between zero crossings and generate CK_T$_{HI\_Z}$ so that the drive signal is enabled (HI_Z is turned off) for the appropriate duration.

Figure 5A:
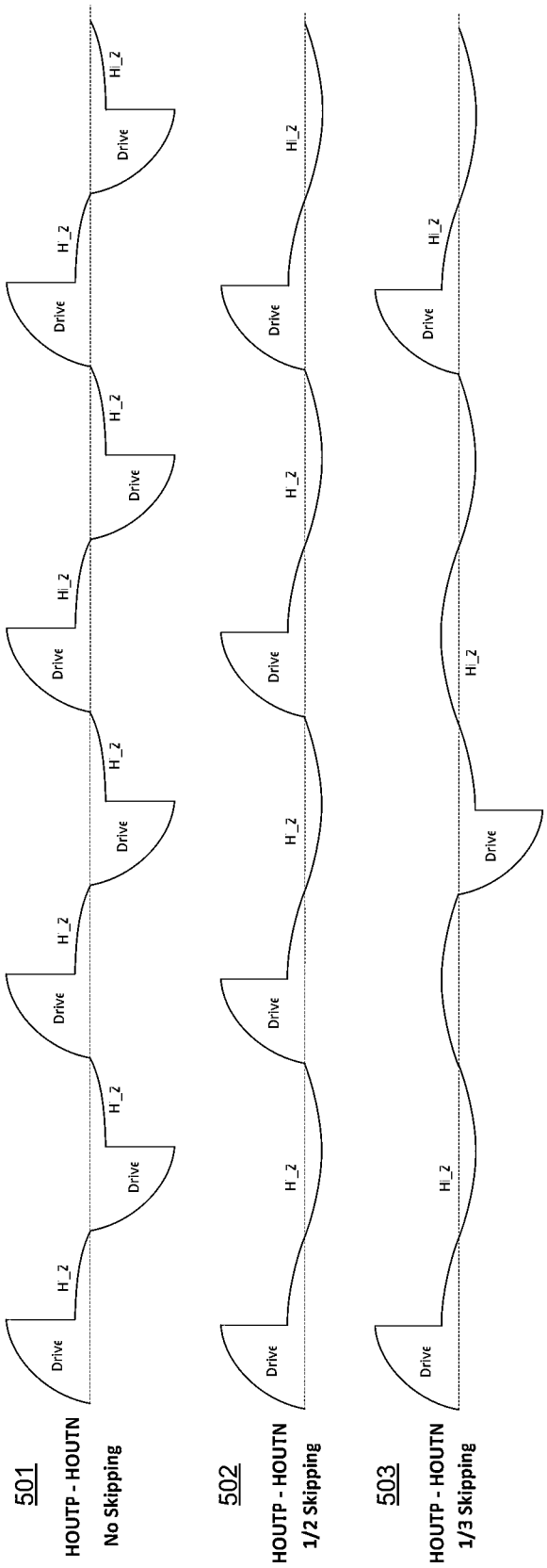
FIGS. 5A-B illustrates techniques for changing the strength of the vibrations according to certain embodiments.

The strength of a mechanical vibration of the actuator may be increased or decreased by changing the amplitude of the drive signal in FIGS. 3A-D and FIG. 4. FIG. 5A illustrates another technique for changing the strength of the vibrations. In this example, one or more half cycles are skipped to adjust the strength of a vibration of the actuator. For instance, if no half cycles are skipped, the drive signal transfers the most power into vibrations as shown at 501. If every other half cycle is skipped, as shown at 502, the vibration strength is reduced. The vibrations strength may be further reduced by applying the drive signal to every third half cycle, for example, as illustrated at 503.

Figure 5B:
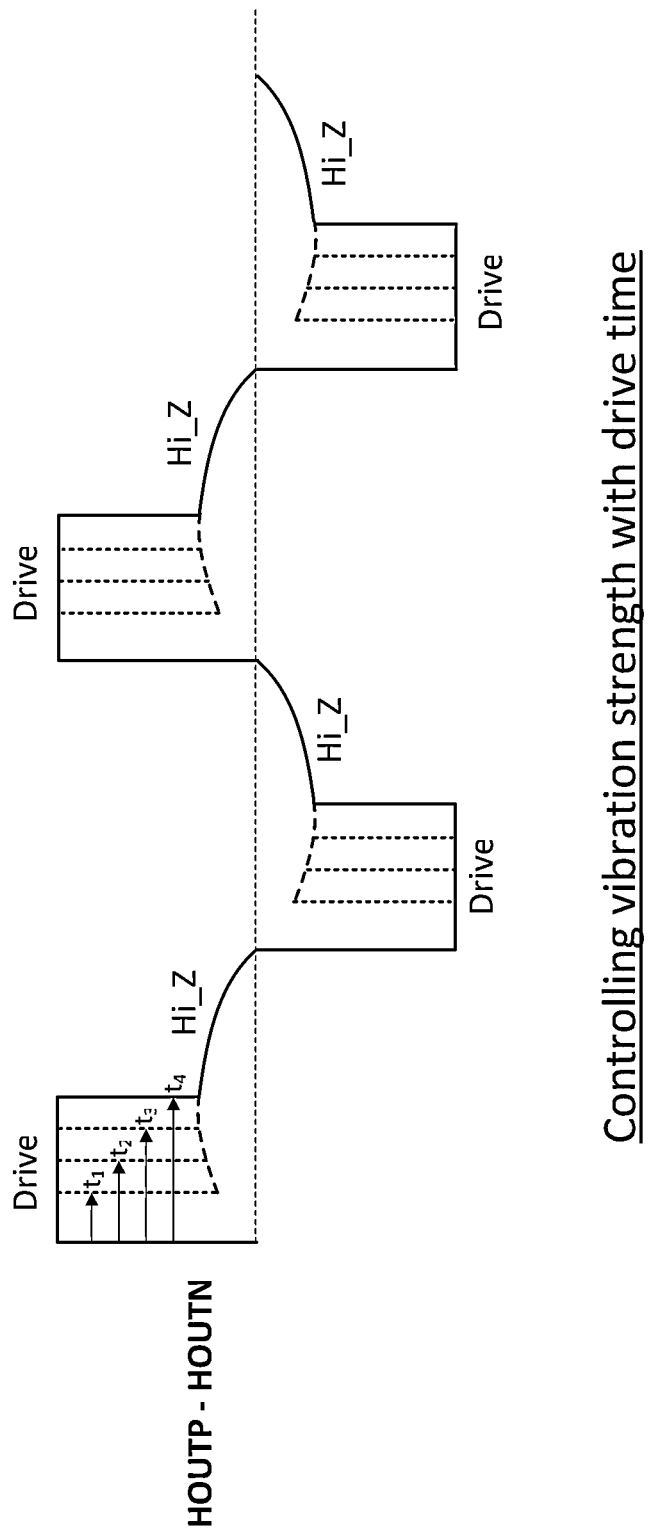

FIG. 5B illustrates another technique for adjusting the strength of vibrations. In this example, the duration of a drive signal is changed to change the strength of vibrations. A drive signal duration of t1 may produce a lower vibration strength than a duration t2, a duration of t2 may produce a lower vibration strength than a duration t3, and a duration of t3 may produce a lower vibration strength than a duration t4.

Figure 6:
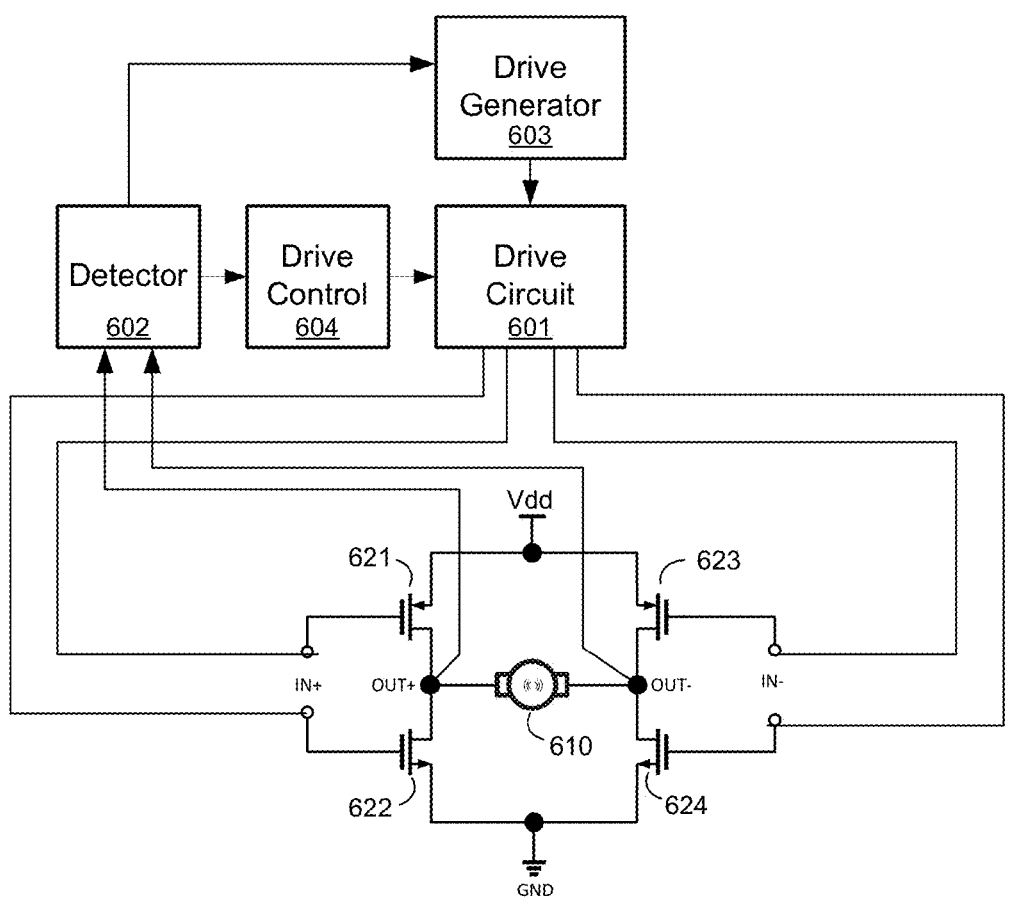
FIG. 6 illustrates a block diagram of an actuator drive circuit according to another embodiment.

FIG. 6 illustrates a block diagram of an actuator drive circuit according to another embodiment. Actuator drive circuit 600 includes a driver circuit 601, detector 602, drive generator 603, drive control 604, and drive transistors 621-624. Drive circuit 601 applies a drive signal to an electromechanical actuator 610. In this example, drive circuit 601 includes four (4) output terminals coupled to the gates of four (4) MOS drive transistors 621-624. Drive circuit 601 produces signals to turn transistors 621-624 on and off to alternately couple terminals of actuator 610 to Vdd or ground. For instance, PMOS transistor 621 selectively couples Vdd to a terminal (labeled, "OUT+") of actuator 610. NMOS transistor 622 selectively couples ground to the OUT+ terminal of actuator 610. Accordingly, Vdd and ground may be applied to one terminal of actuator 610 to drive an internal coil. Similarly, PMOS transistor 623 selectively couples Vdd to a second terminal (labeled, "OUT−") of actuator 610. NMOS transistor 624 selectively couples ground to the OUT− terminal of actuator 610. Thus, Vdd and ground may be applied to the other terminal of actuator 610 to drive the internal coil. This example illustrates a double ended circuit where both terminals of the actuator are driven via transistors 621-624. It is to be understood that in a single-ended implementation only one terminal of the actuator may be used for either driving the actuator and/or detecting the EMF.

As mentioned above, embodiments of the present disclosure may apply a drive signal for a portion of a period and then place the actuator terminals in a high impedance state. High impedance may be achieved by turning transistors 621-624 off at the same time after a portion of the drive signal has been applied, for example. After the portion of the drive signal has been applied, and when transistors 621-624 are turned off, the resulting voltage caused by back EMF may be provided to detector circuit 602.

Detector circuit 602 detects when an induced voltage on actuator 602 crosses a threshold after the drive signal is turned off. Detector circuit 602 has one input coupled to the OUT+ terminal of actuator 610, a second input coupled to the OUT− terminal of actuator 610, and outputs coupled to drive generator 603 and drive control 604. In this example, timing is performed by drive control 604 and drive generator 603. Drive generator 603 produces a drive signal based on the detection of the induced voltage crossing the threshold to align a frequency and phase of the drive signal with the resonant frequency and a phase of the actuator 610. Drive control 604 may control the duration of the drive signal (e.g., by turning the drive signal/Hi Z on and off) and may further control the timing of the drive signal (e.g., where in the cycle the drive signal is turned on and off).

Figure 7:
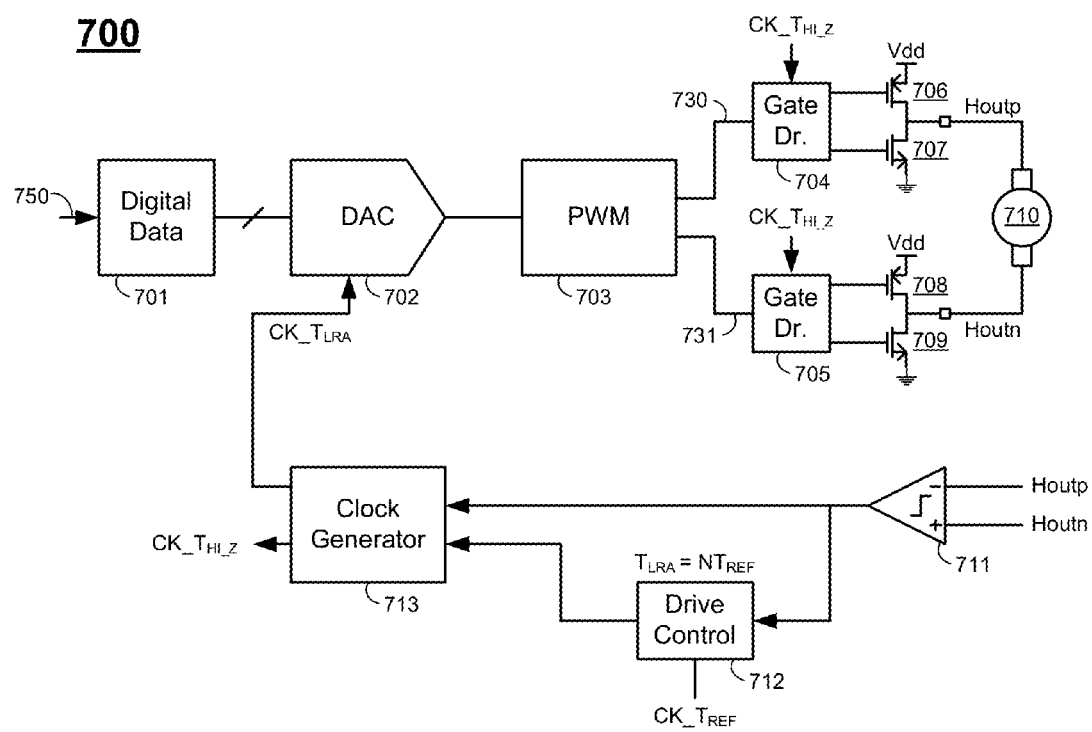
FIG. 7 illustrates another example circuit for driving an actuator according to another embodiment.

FIG. 7 illustrates another example circuit for driving an actuator according to one embodiment. Circuit 700 includes digital data block 701, a digital-to-analog converter (DAC) 702, pulse width modulator (PWM) 703, gate drivers 704-705, transistors 706-709, actuator 710, comparator 711, drive control 712, and clock generator 713. Digital data may be received over a data interface 750, such as a serial bus, and stored in digital data block 701. Digital data may include, for example, data about a drive signal, such as amplitude and data describing the drive signal waveform (e.g., sinusoid, square wave). Digital data about the drive signal is received by DAC 702 and converted into an analog signal (e.g., a continuous time sine wave). In this example, the analog signal is received by PWM 703. PWM may include other feedback paths (not shown) to generate pulse width modulated drive signals 730 and 731 to drive the actuator terminals based on the analog signal. Drive signals 730 and 731 are coupled through gate drive circuits 704 and 705, which translate the voltages and currents to drive transistors 706-709. Transistors 706-709 are configured as an H-bridge, so the following voltages are applied:

Houtp=Vdd and Houtn=ground—Transistor 706 is on, transistor 707 is off, transistor 708 is off, and transistor 709 is on.
Houtp=ground and Houtn=Vdd—Transistor 706 is off, transistor 707 is on, transistor 708 is on, and transistor 709 is off.

In some embodiments, natural filtering of the pulse width modulated drive signal by the inductive coil in actuator 710 may produce a continuous sinusoidal movement in the actuator.

Comparator 711 has first and second input terminals coupled to Houtp and Houtn to detect zero crossings (e.g., changes in polarity between Houtp and Houtn). When the polarity of voltages on Houtp and Houtn cross, an output of comparator 711 changes state.

This example includes a drive control circuit 712 and a clock generator circuit 713 coupled to the output of comparator 711. The output signal from comparator 711 may be used to trigger clock generator 713, which in turn generates a time base signal for DAC 703, $CK\_T_{LRA}$. Accordingly, in this example, $CK\_T_{LRA}$ sets the frequency of the drive signal by forming the time base for DAC 703. In some embodiments, the position of peaks in the drive signal may be configured by digital data or a DAC, for example.

The output terminal of comparator 711 is also coupled to drive control circuit 712. Drive control circuit 712 also receives a reference clock signal, CK_Tref, having a period Tref. A change in state of comparator 711 triggers drive control circuit 712, which starts counting cycles of the reference clock Tref, for example. When the polarity of voltages on Houtp and Houtn cross over again, comparator 711 triggers again to complete a count of drive control circuit 712. For example, a counter may start when a first zero crossing occurs, and a value in the counter may be latched and the counter reset on the next zero crossing. The natural resonant period of the actuator, $T_{LRA}$, is thus given by $T_{LRA}$=NTref. The output of drive control 712 may be used to program clock generator 713 to produce control signal $CK\_T_{HI\_Z}$. Accordingly, drive control circuit 712 may determine each period between zero crossings to set a duration of the drive signal. Once the period is determined, a particular configuration for the duration (e.g., a quarter half cycle) may be generated based on the measured period. Advantageously, the duration tracks changes in the natural period of the actuator. Clock generator 713 may include a programmable voltage controlled oscillator (VCO) or a clock divider, for example, which may be used to generate a time base signal, $CK\_T_{LRA}$, for DAC 702 and signal $CK\_T_{HI\_Z}$, for signaling the gate drivers 704 and 705 to configure transistors 706-709 in a high impedance state (e.g., all transistors turned off).

Figure 8:
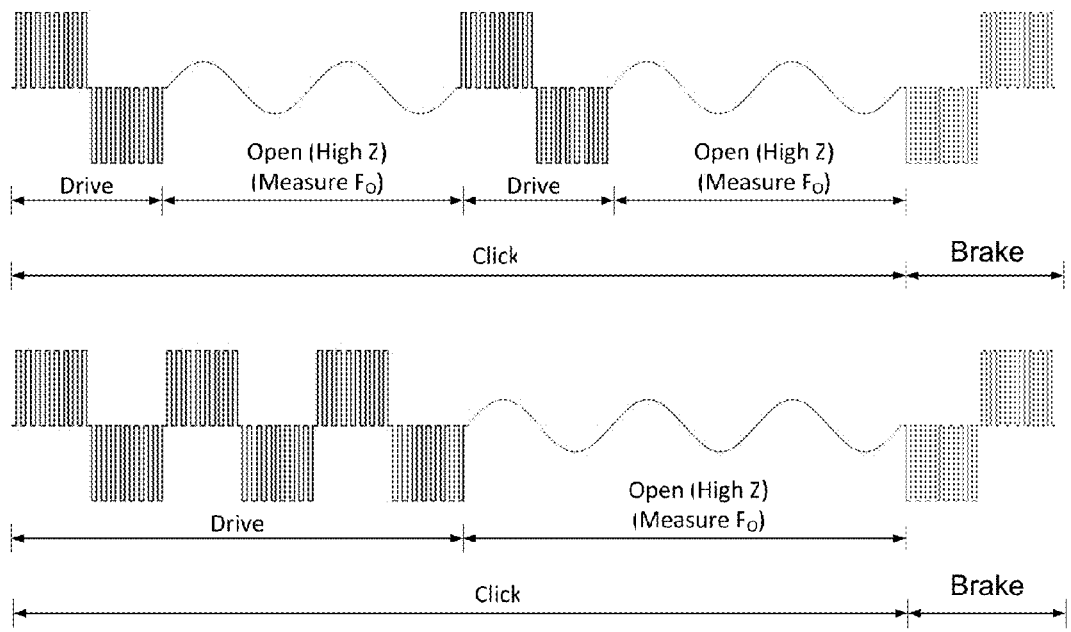
FIG. 8 illustrates driving an actuator over full cycles according to another embodiment.

FIG. 8 illustrates another example embodiment. In this example, the drive signal is applied during one or more full cycles of a vibration period of the electro-mechanical actuator. Here, the drive signal, HOUTP-HOUTN, comprises a plurality of pulses (e.g., PWM pulses), which may be applied to two terminals of an actuator, for example. After a full cycle of the drive signal, the terminals of the actuator are placed in a high impedance state, and zero crossings may be detected and used to measure the resonant frequency of the actuator. The circuit in FIG. 7 may be used to implement this technique, for example. The period of the drive signal may be adjusted based on a measured resonant frequency. FIG. 8 also illustrates that braking may be applied to stop the vibrations by applying an opposite polarity drive signal having a period determined from the zero crossings. Plot 801 illustrates driving the actuator with a full cycle for one period and measuring the actuator's resonant frequency over one or more cycles, and then using the measured frequency to generate another full cycle. Plot 802 illustrates driving the actuator with multiple full cycles, turning off the drive signal to obtain a measurement, and then applying the drive signal with a calibrated resonant frequency (in this case braking). As described above, other embodiments may generate a drive signal during a portion of a cycle, measure the actuators natural resonant frequency, and apply the drive signal for another partial cycle thereafter.

Figure 9:
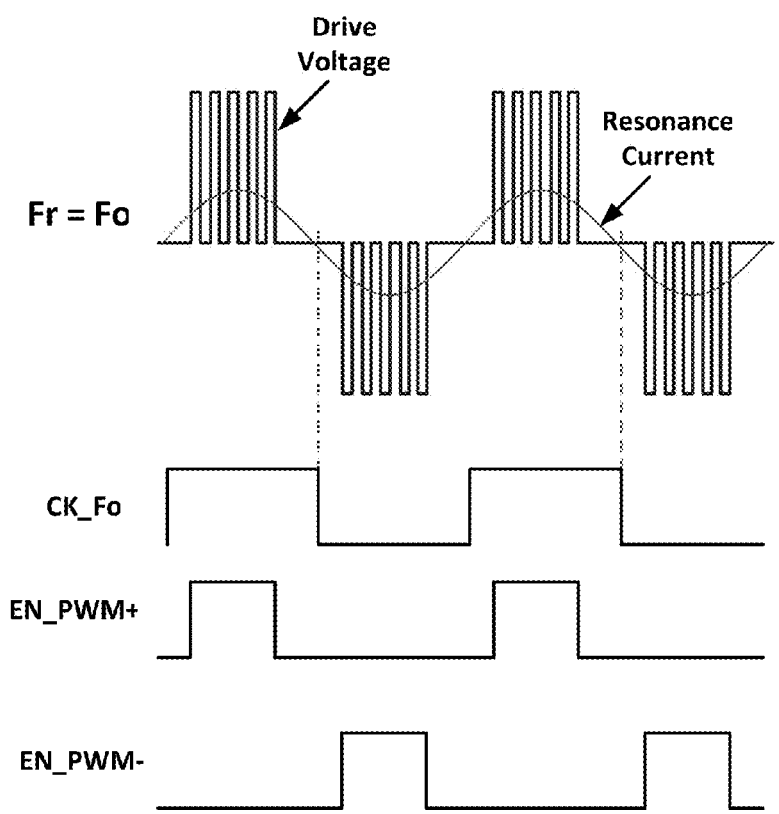
FIG. 9 illustrates turning off the drive signal between zero crossings according to another embodiment.

FIG. 9 illustrates another example embodiment. In this example, a drive signal is applied for only a portion of a cycle and the drive signal is turned off between zero crossings, thereby creating a dead zone where there is no drive signal during a portion of each half cycle. As illustrated in FIG. 9, the drive signal may be a series of pulses applied during a portion of each half cycle. In this example, the frequency of the drive signal is set using a time base clock, CK_Fo, and two enable signals, EN_PWM+ and EN_PWM−, that are derived from CK_Fo. Zero crossings are detected by a detection circuit as described above. The zero crossings may be used to set the frequency of CK_Fo. For example, if the frequency CK_Fo is greater than the natural resonant frequency of the actuator, then the time between zero crossings will be greater than the time between successive edges of CK_Fo. Similarly, if the frequency CK_Fo is less than the natural resonant frequency of the actuator, then the time between zero crossings will be less than the time between successive edges of CK_Fo. Zero crossings may be detected and the frequency of CK_Fo may be increased or decreased to match the resonant frequency of the actuator, for example. EN_PWM+ may enable positive polarity pulses for a portion of a half cycle a fixed time after the rising edge of CK_Fo. Similarly, EN_PWM− may enable negative polarity pulses for a portion of a half cycle a fixed time after the falling edge of CK_Fo, for example.

Figure 10:
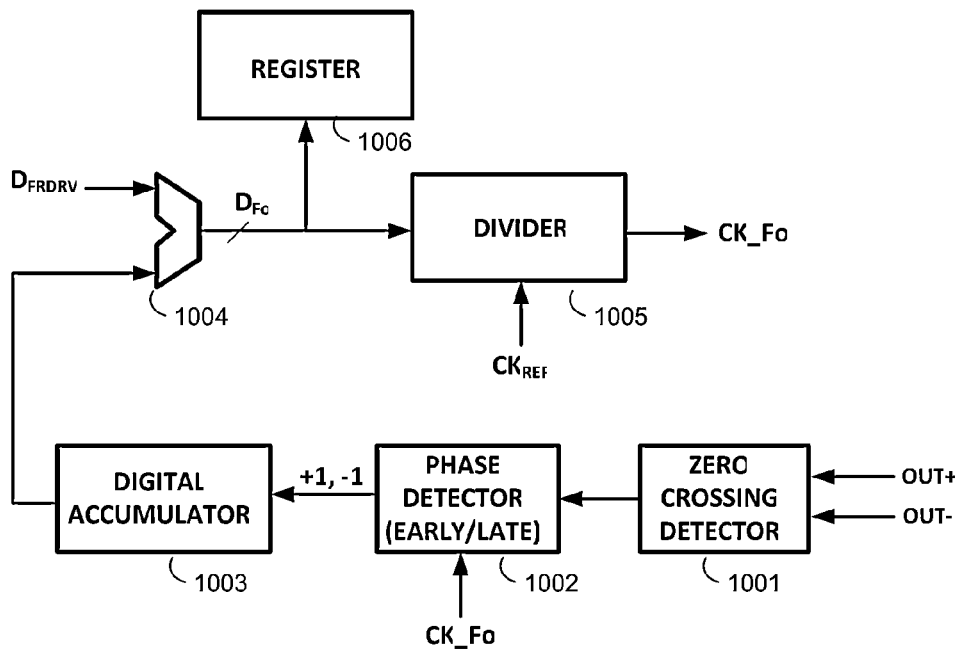
FIG. 10 illustrates a detection circuit for driving an actuator according to another embodiment.

FIG. 10 illustrates a circuit architecture for driving an actuator according to another embodiment. The circuit illustrated here detects zero crossings on actuator terminals and adjusts the frequency of the drive signal to match the resonant frequency of the actuator. A zero crossing detector 1001 receives OUT+ and OUT− signals from an actuator and generates an output indicating when a zero crossing has occurred. Zero crossing detector 1001 may be a comparator, for example. In this example, a timing circuit includes a phase detector 1002, accumulator 1003, adder 1004, and divider 1005. Phase detector 1002 receives an output signal from zero crossing detector 1001 and a time base signal CK_Fo. Time base signal may be used to set the frequency of a drive signal, for example. If an edge, for example, of the time base signal occurs before an output from the zero crossing detector (indicating that the time base frequency is too high), then the phase detector may output a decrement signal (e.g., −1) to decrease the frequency of CK_Fo. On the other hand, if an edge, for example, of the time base signal occurs after an output from the zero crossing detector (indicating that the time base frequency is too low), then the phase detector may output a increment signal (e.g., +1) to increase the frequency of CK_Fo. The output of phase detector 1002 is coupled to an input of digital accumulator 1003. Digital accumulator 1003 increments or decrements based on the output of phase detector 1002. Digital accumulator 1003 is coupled to one input of an adder 1004. The other input of adder 1004 receives an initial divider value, $D_{FRDRV}$, which sets the initial value of the frequency of CK_Fo. The output of the adder 1004 is a digital divider value $D_{Fo}$, which is loaded into divider 1005 and register 1006. Divider 1005 receives a reference clock signal, CKref, and generates time base signal, CK_Fo by dividing CKref by $D_{Fo}$. Accordingly, if the frequency of CK_Fo is lower than the resonant frequency of the actuator, digital accumulator 1003 decreases reference clock divider value DFo to increase the frequency of CK_Fo. On the other hand, if the frequency of CK_Fo is greater than the resonant frequency of the actuator, digital accumulator 1003 increases reference clock divider value DFo to decrease the frequency of CK_Fo.

Figure 11:
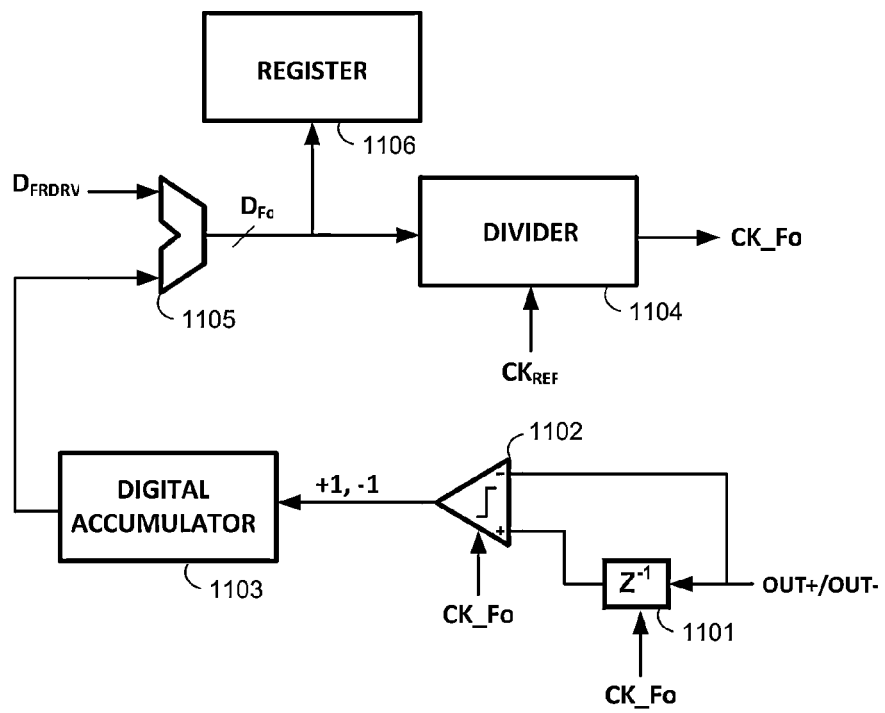
FIG. 11 illustrates a detection circuit according to another embodiment.
Figure 12:
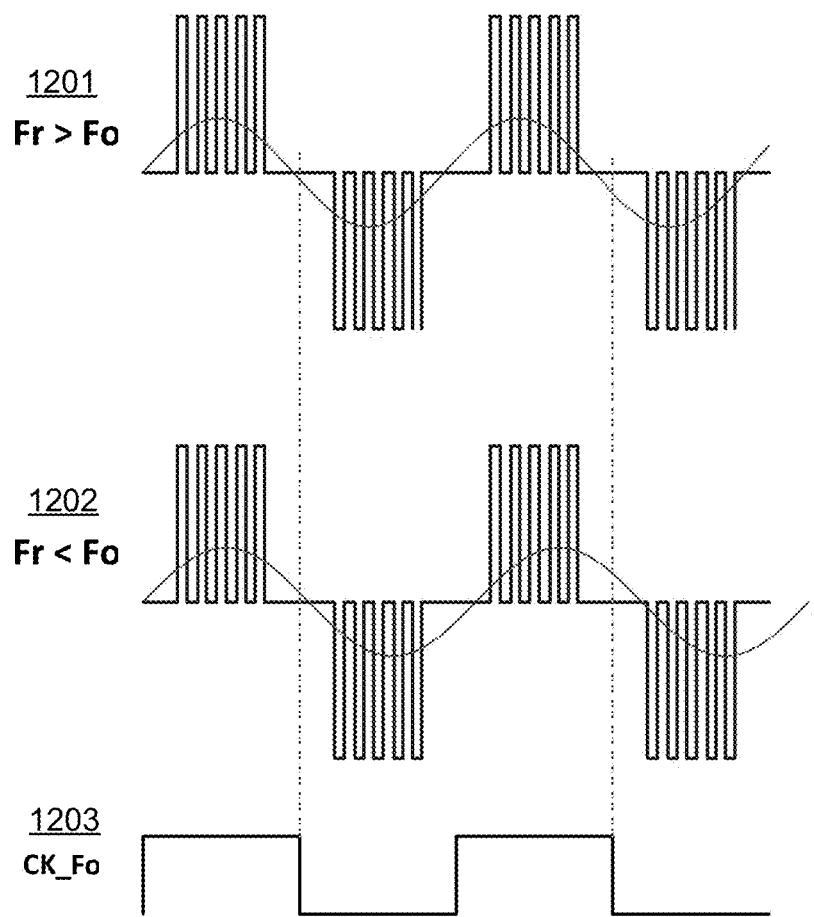
FIG. 12 illustrates timing relations between a time base signal and a resonant frequency of an actuator according to another embodiment.

FIG. 11 illustrates another embodiment. In this example, a detection circuit includes a delay element ($Z^{-1}$) 1101 and a comparator 1102 to detect a change in the induced voltage between two successive high impedance phases. Delay 1101 is coupled to one terminal of an actuator (e.g., OUT+ or OUT−). Delay 1101 may also receive time base signal CK_Fo. Delay 1101 may be a sample and hold circuit, for example, that samples a voltage on the actuator terminal once per cycle of CK_Fo. Comparator 1102 has one input coupled to the input of delay 1101 (the terminal of the actuator) and a second input coupled to the output of delay 1101. Comparator 1102 also has a clock input coupled to time base signal CK_Fo to compare an induced voltage on the actuator on successive edges of the CK_Fo. For instance, an edge of CK_Fo causes comparator 1102 to compare a present induced voltage on the actuator output terminal to an induced voltage on the actuator terminal on the previous cycle of CK_Fo (a delayed induced voltage). The present induced voltage from the actuator may be different than the delayed induced voltage from the actuator by a first polarity (e.g., greater than) or a second polarity (e.g., less than), which depends on the difference between the time base signal CK_Fo frequency and the actuator resonant frequency. In this example, if the frequency (Fo) of CK_Fo is less than the resonant frequency of the actuator (Fr) as illustrated at 1201 in FIG. 12, then the present induced voltage on the actuator terminal will be less than the delayed induced voltage, and comparator 1102 outputs a negative value to decrease the divider value and increase the frequency of CK_Fo. On the other hand, if the frequency (Fo) of CK_Fo is greater than the resonant frequency of the actuator (Fr) as illustrated at 1202 in FIG. 12, then the present induced voltage on the actuator terminal will be greater than the delayed induced voltage, and comparator 1102 outputs a positive value to increase the divider value and decrease the frequency of CK_Fo. The output of comparator 1102 may be coupled to a timing circuit including accumulator 1103, adder 1105, register 1106, and divider 1104, which operate as described above.

The above description illustrates various embodiments of the present disclosure along with examples of how aspects of the particular embodiments may be implemented. The above examples should not be deemed to be the only embodiments, and are presented to illustrate the flexibility and advantages of the particular embodiments as defined by the following claims. Based on the above disclosure and the following claims, other arrangements, embodiments, implementations and equivalents may be employed without departing from the scope of the present disclosure as defined by the claims.

What is claimed is:

1. A method comprising:
    applying a drive signal to an actuator during at least a portion of a plurality of half cycles of a period of the drive signal, wherein the actuator has a resonant frequency;
    detecting when an induced voltage on the actuator crosses a threshold after the drive signal is turned off;
    triggering a drive clock signal in a clock generator circuit in response to the detecting; and
    triggering the drive signal in response to the drive clock signal to align a frequency and phase of the drive signal with the resonant frequency and a phase of the actuator, wherein a positive polarity drive signal is triggered by the drive clock signal a fixed time after a rising edge of the drive clock signal and a negative polarity drive signal is triggered by the drive clock signal a fixed time after a falling edge of the drive clock signal.

2. The method of claim 1 wherein the portion of the plurality of half cycles is less than or equal to a half cycle.

3. The method of claim 1 wherein the portion of the plurality of half cycles is programmable.

4. The method of claim 1 wherein a peak of the drive signal is approximately centered between a first time when the induced voltage on the actuator crosses the threshold and a second time when the induced voltage on the actuator crosses the threshold.

5. The method of claim 1 further comprising skipping one or more half cycles to adjust a strength of a vibration of the actuator.

6. The method of claim 1 further comprising changing a duration of the portion of the plurality of half cycles to adjust a strength of a vibration of the actuator.

7. The method of claim 1 further comprising applying the drive signal during one or more full cycles followed by at least one partial cycle, wherein said detecting is performed only during said partial cycle, and wherein the period of the drive signal is determined based on when the induced voltage crosses the threshold.

8. The method of claim 1 wherein the induced voltage on the actuator is a back electromotive force (EMF) and the threshold is a zero crossing.

9. The method of claim 1 further comprising applying a high impedance to the actuator after applying the drive signal and before said detecting.

10. The method of claim 1 wherein the drive signal comprises one of a partial sinusoidal analog signal, a square wave, and a plurality of pulses.

11. The method of claim 1 wherein detection of zero crossings of the threshold sets a period of the drive clock signal and sets a period of a second clock signal driving a high impedance state of the drive circuit.

12. The method of claim 11 wherein a duty cycle of the second clock signal sets the duration of the drive signal and high impedance state.

13. The method of claim 1 wherein when the drive clock frequency is greater than the resonant frequency of the actuator, the time between detected threshold crossings is greater than the time between successive edges of the drive clock, and wherein when the drive clock frequency is less than the resonant frequency of the actuator, the time between detected threshold crossings is less than the time between successive edges of the drive clock.

14. A circuit comprising:
a driver circuit to apply a drive signal to an actuator during a portion of a plurality of half cycles of a period of the drive signal, wherein the actuator has a resonant frequency;
a detection circuit to detect when an induced voltage on the actuator crosses a threshold after the drive signal is turned off and to provide a detection signal in response thereto; and
a timing circuit comprising a clock generator circuit having an input coupled to the detection circuit and an output coupled to the driver circuit, the timing circuit configured to trigger a drive clock signal in response to the detection signal provided by the detection circuit,
wherein the driver circuit is configured to trigger the drive signal in response to the drive clock signal to align a frequency and phase of the drive signal with the resonant frequency and a phase of the actuator,
wherein a positive polarity drive signal is triggered by the drive clock signal a fixed time after a rising edge of the drive clock signal and a negative polarity drive signal is triggered by the drive clock signal a fixed time after a falling edge of the drive clock signal.

15. The circuit of claim 14 wherein the portion of the plurality of half cycles is less than or equal to a half cycle.

16. The circuit of claim 14 wherein the portion of the plurality of half cycles is programmable.

17. The circuit of claim 14 wherein a peak of the drive signal is approximately centered between a first time when the induced voltage on the actuator crosses the threshold and a second time when the induced voltage on the actuator crosses the threshold.

18. The circuit of claim 14 wherein one or more half cycles are skipped to adjust a strength of a vibration of the actuator.

19. The circuit of claim 14 wherein the driver circuit further comprises a plurality of transistors configured to apply the drive signal to a first terminal and a second terminal of the actuator, wherein the transistors are turned off after applying the drive signal.

20. The circuit of claim 14 wherein the detection circuit comprises a comparator having at least one input directly connected to a first terminal of the actuator, wherein the timing circuit further comprises a drive control circuit, the drive control circuit having a first input coupled to an output of the comparator and a second input coupled to receive a reference clock signal to determine the resonant frequency of the actuator, and in accordance therewith, program a frequency of a time base signal generated by the clock generator, wherein the time base signal sets a duration of the drive signal.

21. The circuit of claim 14 wherein the timing circuit comprises:
a phase detector having a first input coupled to an output of the comparator and a second input coupled to receive a time base signal;
an accumulator coupled to an output of the phase detector;
an adder having a first input coupled to an output of the accumulator and a second input to receive an initial divider value; and
a divider having a first input coupled to an output of the adder to receive a divider value and a second input to receive a reference clock signal,
wherein if the frequency of the time base signal is lower than the resonant frequency of the actuator, the accumulator decreases the divider value to increase the frequency of the time base signal, and if the frequency of time base signal is greater than the resonant frequency of the actuator, the accumulator increases the divider value to decrease the frequency of time base signal.

22. The circuit of claim 14 wherein the detection circuit comprises:
a delay element having a first input coupled to one terminal of the actuator and a second input coupled to receive a time base signal; and
a comparator having a first input coupled to the input of the delay element and a second input coupled to an output of the delay element to compare the induced voltage on the actuator on successive edges of the time base signal,
and wherein the timing circuit comprises:
an accumulator coupled to an output of the comparator;
an adder having a first input coupled to an output of the accumulator and a second input to receive an initial divider value; and
a divider having a first input coupled to an output of the adder to receive a divider value and a second input to receive a reference clock signal,
wherein if a frequency of the time base signal is lower than the resonant frequency of the actuator, then a present induced voltage from the actuator is different than a delayed induced voltage from the actuator by a first polarity, and the frequency of the time base signal is increased, and if the frequency of the time base signal is greater than the resonant frequency of the actuator, then a present induced voltage from the actuator is different than the delayed induced voltage from the actuator by a second polarity, and the frequency of the time base signal is decreased.

23. The circuit of claim 14 wherein the induced voltage on the actuator is a back electromotive force (EMF) and the threshold is a zero crossing, and wherein the drive signal comprises a plurality of pulses applied between zero crossings.

* * * * *